United States Patent [19]
Bingham et al.

[11] Patent Number: 5,644,573
[45] Date of Patent: Jul. 1, 1997

[54] METHODS FOR COORDINATING UPSTREAM DISCRETE MULTI-TONE DATA TRANSMISSIONS

[75] Inventors: John A.C. Bingham, Palo Alto; Krista S. Jacobsen, Mountain View, both of Calif.

[73] Assignee: Amati Communications Corporation, San Jose, Calif.

[21] Appl. No.: 377,023

[22] Filed: Jan. 20, 1995

[51] Int. Cl.$^6$ .................................................. H04J 3/06
[52] U.S. Cl. ............................................ 370/503; 370/528
[58] Field of Search ................................. 370/101, 105.1, 370/105.2, 105.5, 100.1, 103, 111, 94.3, 95.1, 17, 104.1, 95.3; 375/356

[56] References Cited

U.S. PATENT DOCUMENTS

| | | | |
|---|---|---|---|
| 4,256,925 | 3/1981 | Goode | 370/104 |
| 4,606,023 | 8/1986 | Dragoo | 370/94.1 |
| 4,773,065 | 9/1988 | Koyobashi et al. | 370/67 |
| 4,870,408 | 9/1989 | Zdunek et al. | 370/95.1 |
| 5,072,445 | 12/1991 | Nawata | 370/104.1 |
| 5,177,739 | 1/1993 | Basnuevo et al. | 370/85.8 |
| 5,317,571 | 5/1994 | Marcel et al. | 370/103 |

OTHER PUBLICATIONS

John A.C. Bingham, "Multicarrier Modulation: An Idea for Data Transmission Whose Time Has Come", IEEE Comm. Mag., pp. 5–14 May 1990.

*Primary Examiner*—Douglas W. Olms
*Assistant Examiner*—Matthew C. Phillips
*Attorney, Agent, or Firm*—Hickman Beyer & Weaver

[57] ABSTRACT

A variety of methods of coordinating communications between a plurality of remote units and a central unit to facilitate communications using a frame based discrete multi-tone (DMT) transmission scheme am disclosed. In one aspect of the invention, synchronized quiet times are periodically provided in the upstream communication stream. The synchronized quiet times are used to handle a variety of control type functions such as synchronization of new remote units, transmission channel quality checking and handling data transfer requests. The information received is used to facilitate the dynamic allocation of bandwidth during use. In another aspect, a data request signal may be used to indicate either a desire to transmit at a particular data rate or a desire to transmit a particular amount of information. In the former case, the central unit allocates sufficient sub-channels to the remote unit to facilitate transmission at a requested data rate that is specified in the data request information. In the latter case, the central unit allocates one or more sub-channels for an amount of time sufficient to transmit an amount information that is specified in the data request information.

24 Claims, 7 Drawing Sheets

METHODS FOR COORDINATING UPSTREAM DISCRETE MULTI-TONE DATA TRANSMISSIONS

BACKGROUND OF THE INVENTION

The present invention relates generally to discrete multi-tone communication systems in which a central unit services a plurality of remote units. More specifically, it relates to methods for coordinating upstream communications from the remote units.

Discrete Multi-Tone (DMT) data transmission schemes have been shown to facilitate high performance data transmission. Among the benefits of DMT architectures is that they have high spectral efficiencies and can adaptively avoid various signal distortion and noise problems. Since they have very high data transmission capabilities, in most applications selection of a DMT data transmission scheme will provide plenty of room for the expansion of service as the demands on the data transmission system increase. Hence, discrete MultiTone technology has applications in a variety of data transmission environments. For example, at the time of this writing, the Alliance For Telecommunications Information Solutions (ATIS), which is a group accredited by the ANSI (American National Standard Institute) Standard Group, is nearing finalization of a discrete multi-tone based standard for the transmission of digital data over Asymmetric Digital Subscriber Lines (ADSL). The standard is intended primarily for transmitting video data over ordinary telephone lines, although it may be used in a variety of other applications as well. The pending North American Standard is referred to as the T1E1.4 ATIS Standard, and is presently set forth in Standard Contribution No. 94-007, rev. 8, dated Jan. of 1995, which is incorporated herein in its entirety.

Transmission rates under the ADSL standard are intended to facilitate the transmission of information at rates of at least 6 million bits per second (i.e., 6+Mbit/s) over twisted-pair phone lines. The standardized discrete multi-tone (DMT) system uses 256 "tones" or "sub-channels" that are each 4.3125 kHz wide in the forward (downstream) direction. In the context of a phone system, the downstream direction is generally considered transmissions from the central office (typically owned by the telephone company) to a remote location that may be an end-user (i.e., a residence or business user). In other systems, the number of tones used may be widely varied. However when IFFT modulation is done, typical values for the number of available sub-channels (tones) are integer powers of two, as for example, 128, 256, 512, 1024 or 2048 sub-channels.

The Asymmetric Digital Subscriber Lines standard also contemplates the use of a reverse signal at a data rate in the range of 16 to 800 Kbit/s. The reverse signal corresponds to transmission in an upstream direction, as for example, from the remote location to the central office. Thus, the term Asymmetric Digital Subscriber Line comes from the fact that the data transmission rate is substantially higher in the forward direction than in the reverse direction. This is particularly useful in systems that are intended to transmit video programming or video conferencing information to a remote location over the telephone lines. By way of example, one potential use for the systems allows residential customers to obtain video information such as movies over the telephone lines or cable rather than having to rent video cassettes. Another potential use is in video conferencing.

The discrete multi-tone (DMT) transmission scheme has the potential for use in applications well beyond data transmissions over telephone lines. Indeed, DMT can be used in a variety of other digital subscriber access systems as well. For example, it may be used in cable based subscriber systems (which typically use coaxial cable) and wireless subscriber systems such as digital cellular TV. In cable systems, a single central unit (central modem) is typically used to distribute digital signals to more than one customer, which means more than one remote unit (remote modem). While all of the remote modems can reliably receive the same digital signals, the upstream transmissions must be coordinated to prevent confusion at the central modem as to the source of the upstream signals. In some existing cable systems (which do not use discrete multi-tone transmission schemes), each remote unit is given a dedicated frequency band over which it is to communicate with the central station. However, such an approach is inherently an inefficient use of transmission bandwidth and typically requires the use of analog filters to separate transmissions from the various remote units. Other existing cable systems use a single wide band for all remote units, which use time division multiple access (TDMA) to access the upstream channel. This approach is inefficient because of the lower total capacity of the single channel and because of the time required for the accessing process. Stationary digital cellular transmission systems face similar obstacles. The ability to access the channel on both a time-and frequency-divided basis would more efficiently utilize the transmission channel. However, the inherent multiplexing nature of DMT has previously restricted its application to point-to-point transmission because transmissions from different sources must be synchronized for the all-digital multiplexing to function properly.

ADSL applications have the potential for a similar problem, although it is typically more limited in nature. Specifically, a single line may service a plurality of drop points at a particular billing address (which may typically be a home or an office). That is, there may be several telephone "jacks" through which the user may wish to receive signals. To facilitate service to multiple locations (jacks) over a single line, the use of a master modem has been proposed to facilitate synchronization. However, this is perceived as being a relatively expensive and undesirable solution. Accordingly, it would be desirable to provide a mechanism in discrete multi-tone data transmission systems that facilitates the synchronization of signals from a plurality of remotes so that a central unit can coordinate and reliably interpret signals sent from the remotes.

One method of synchronization remote units utilizes the concept of a dedicated overhead bus. That is, one or more dedicated overhead sub-channels are used to facilitate initializing new remote units. This system is described in John M. Cioffi's co-pending U.S. patent application Ser. No. 08/252,829, which is assigned to the assignee of the present application and is incorporated herein by reference. Although the use of an overhead bus works well in some applications, other methods of coordinating multi-point to point transmission are desirable as well.

Another feature of transmission systems currently utilized for communications from a remote unit to a central unit is that they either transmit data at a designated maximum rate (frequency-division multiplexing), or they transmit data in packets of a particular size (time-based multiplexing). They do not permit both. This limits the efficiency of the use of the transmission channels. The amount of bandwidth is limited in scope either by the amount of time or the number of frequencies available for the remote units to utilize. Accordingly, it would be desirable to provide a mechanism through which when necessary, a remote unit can specify a desire to transmit at a particular data rate and when the data rate is not a concern, the remote unit may indicate that it desires to transmit a designate amounts of information.

SUMMARY OF THE INVENTION

To achieve the foregoing and other objects and in accordance with the purpose of the present invention, a bi-directional data transmission system that facilitates communications between a central unit and a plurality of remote units using a frame based discrete multi-tone (DMT) transmission scheme is disclosed. The present invention provides several novel arrangements and methods for coordinating communications between a plurality of remote units and a central unit to facilitate multi-point-to-point transmission.

In one aspect of the present invention, synchronized quiet times are periodically provided in the upstream communication stream. The synchronized quiet times are used to handle a variety of overhead type functions such as initialization of new remote units, transmission channel quality checking and handling data transfer requests.

In one embodiment, a method of synchronizing flames transmitted from an initializing remote unit to the central unit with flames transmitted from other remote units to the central unit is described. In this embodiment, synchronized quiet times are periodically provided on the plurality of discrete sub-channels provided for upstream communications. When a remote unit is being initialized, it transmits a broad-band initialization signal to the central unit during a synchronized quiet time. The broad-band initialization signal includes a plurality of initialization signals transmitted over distinct sub-channels. In one preferred embodiment, the remote unit monitors downstream communication when it desires initialization and substantially synchronizes the frame boundary of the broad-band initialization signal with a frame timing marker carried in downstream signals received by the remote unit. The central unit receives the broad-band initialization signal and sends a synchronization signal back to the first remote unit. The synchronization signal includes information indicative of a frame boundary phase shift required to better synchronize frame boundaries of signals sent by the remote unit with frame boundaries of signals sent by other remote units that are in communication with the central unit. The remote unit then shifts the phase of the frames it outputs to facilitate synchronization.

The synchronized quiet time used in this embodiment has a period that is sufficiently long for a quiet period marker to be transmitted from the central unit to the remote unit that is furthest from the central unit, and an initialization signal returned from that furthest remote unit to the central unit all within the synchronized quiet time.

In a second embodiment of the present invention, a method of dynamically checking sub-carrier transmission quality from the remote units to the central unit is described. This facilitates the allocation of bandwidth to the remote units by the central unit. In this embodiment, training signals are transmitted from one of the remote units over the multiplicity of sub-channels provided for facilitating upstream communications during a selected synchronized quiet time. The training signals are monitored by the central unit which determines a set of channel characteristics indicative of the bit capacities of the various sub-channels to deliver signals from the selected remote. The central unit may then use the set of channel characteristics when determining which sub-channels to allocate to the selected remote unit for upstream communications.

In one preferred embodiment, the transmitting and monitoring steps may be repeated for a plurality of different remote units in order to determine channel characteristics for each of the different remote units. The different remote units are preferably arranged to transmit their respective training signals during different quiet times. The set of channel characteristics for each remote may be stored within a matrix of channel characteristics that contains information indicative of the channel capacities from each of the remote units to central unit. The channel characteristic information may then be used to facilitate the dynamic allocation of bandwidth to various remote units. In another preferred embodiment, the remote units only transmit their respective training signals in response to the reception of a retraining signal from the central unit. This facilitates control over the system.

In a third embodiment of the invention, a method of informing the central unit of the transmission requirements of a remote unit is described. In this embodiment, a remote that wishes to initiate or change communications transmits a data request signal to the central unit at a time other than during a quiet time interval. The central unit then sends an authorization signal to the remote unit allocating a particular quiet time. The remote then transmits data request information over a plurality of the discrete sub-channels during the allocated quiet time. Knowing the remote unit's requirements, the central unit allocates one ore more sub-channels to the remote unit in response to the data request information.

In one preferred embodiment, the data request signal may indicate either a desire to transmit at a particular data rate or a desire to transmit a particular amount of information. In the former case, the central unit allocates sufficient sub-channels to the remote unit to facilitate transmission at a requested data rate that is specified in the data request information. In the latter case, the central unit allocates one or more sub-channels for an amount of time sufficient to transmit an amount information that is specified in the data request information.

In another preferred embodiment, the remote unit may transmit a defined data packet request signal after the data request information has been defined and transmitted. When this occurs, the central unit immediately allocates at least one sub-channel to the selected first remote unit in direct response to the defined data packet request.

In another preferred embodiment, the remote units monitor downstream communications prior to transmitting a data request signal and only transmit the data request signal over sub-channels that are not in use. In still another preferred embodiment, a first value of the data request signal is indicative of a data rate request, a second value of the data request signal is indicative of a data packet request and a third value of the data request signal is indicative of a defined data packet request. In such an arrangement, the data request signal may be as small as a two bit signal.

In yet another embodiment, each frame of the discrete multi-tone signal includes a multiplicity of symbols and each remote unit is assigned an associated symbol during which it may transmit its data request symbol. In this embodiment, the central unit determines the identity of a particular remote unit transmitting a data request signal based at least in part upon the symbol during which the data request signal is received.

It should be appreciated that the various embodiments may be used either standing alone or in combination with one or more of the others. The various described quiet times need not be of the same length and typically, the quiet times described in conjunction with the third embodiment would be more frequent than the other two. The described systems may be used regardless of whether the downstream signals are also discrete multi-tone. In several preferred embodiments, the bi-directional data transmission system is a cable system that includes the transmission of signals over a coaxial cable, although other systems are contemplated as well.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

As described in the background section of this application, one limitation of discrete multi-tone transmission systems is that in order to support a plurality of drop points serviced by a single line, the upstream signals must be synchronized when they arrive at the central unit. This synchronization problem has limited the attractiveness of Discrete Multi-tone (DMT) data transmission schemes in certain applications such as cable systems and wireless cellular television delivery since these systems use a single line (medium) to service a relatively large number of independent remote units, which would typically be operated by different subscribers.

Figure 1:
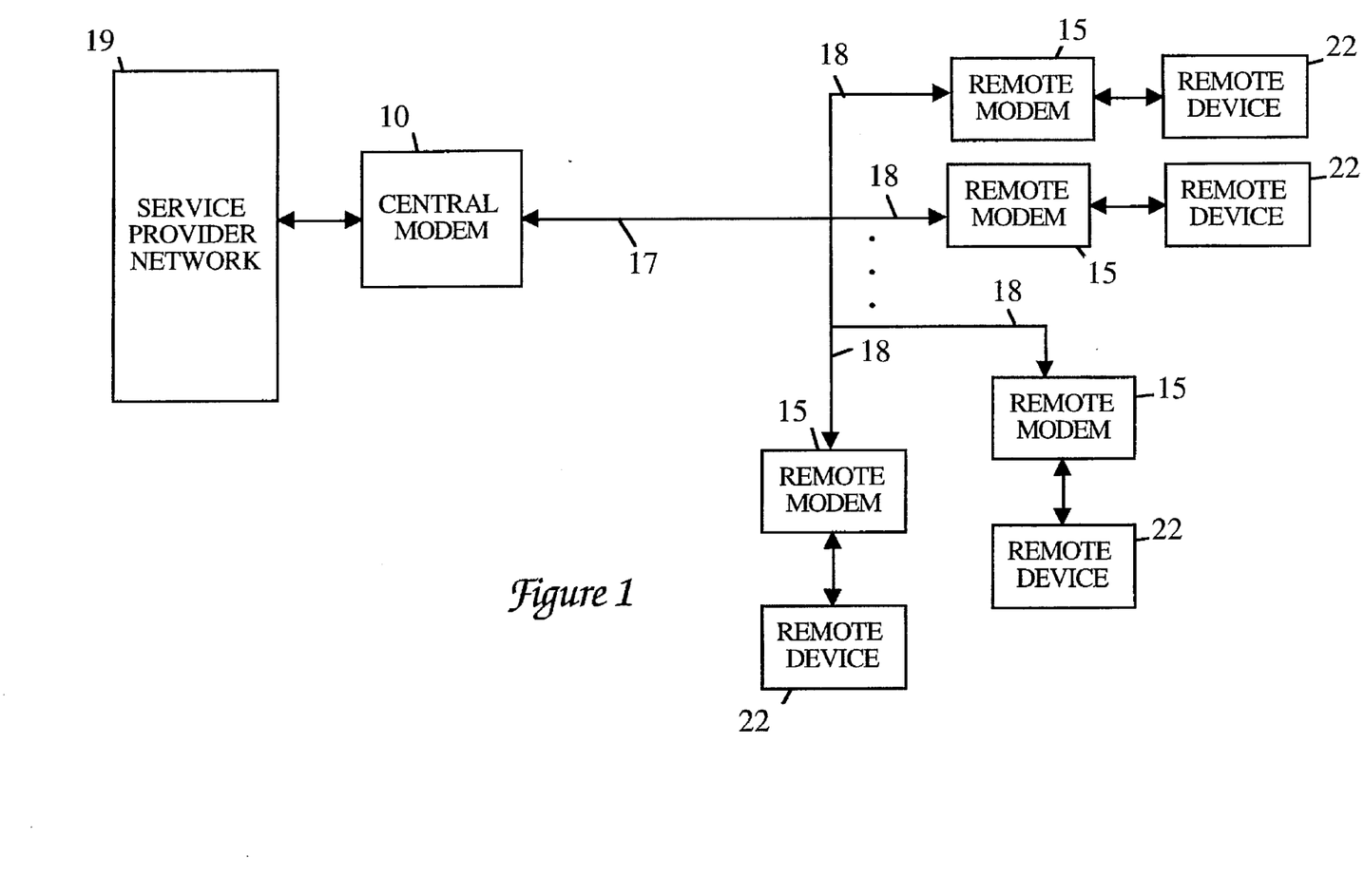
FIG. 1 is block diagram of a communication system including a head end central unit that services a plurality of remote units.

Referring initially to FIG. 1, a schematic transmission scheme for a typical multi-user subscriber network will be described. A central unit 10 (which includes a central modem) communicates with a plurality of remote units over a common transmission line 17 which is split into a plurality of feeds 18. Each feed 18 services an associated remote unit which typically includes a remote modem 15 which receives the signals and a remote device 22 which uses the data. A service provider 19 would typically be arranged to provide the data to the central modem for transmission to the remote modems 15 and to handle the data received by the central modem from the remote modems. The service provider 19 can take any suitable form. By way of example, the service provider can take the form of a network server. The network server can take the form of a dedicated computer or a distributed system. A variety of transmission mediums can be used as the transmission line. By way of example, twisted pair phone lines, coaxial cables, fiber lines and hybrids that incorporate two or more different mediums all work well. This approach also works well in wireless systems.

As will be appreciated by those skilled in the art, one requirement of discrete multi-tone data transmission systems such as those contemplated herein is that if two or more units (typically two remote units) are attempting to independently transmit information to a third unit (i.e. the central unit 10), the signals from the remote units must by synchronized or at least some of the signals will be incomprehensible to the central unit 10. The problem with using discrete multi-tone transmissions in such a system is that the length of the feeds 18 will typically vary from remote to remote. Therefore, even if the remotes synchronize with the clock of the central unit 10, their communications back to the central unit 10 will be phase shifted by an amount that is dependent at least in part on the length of the associated feed. In practice, these types of phase shifts can make remotely initiated communications unintelligible to the central modem.

Figure 2:
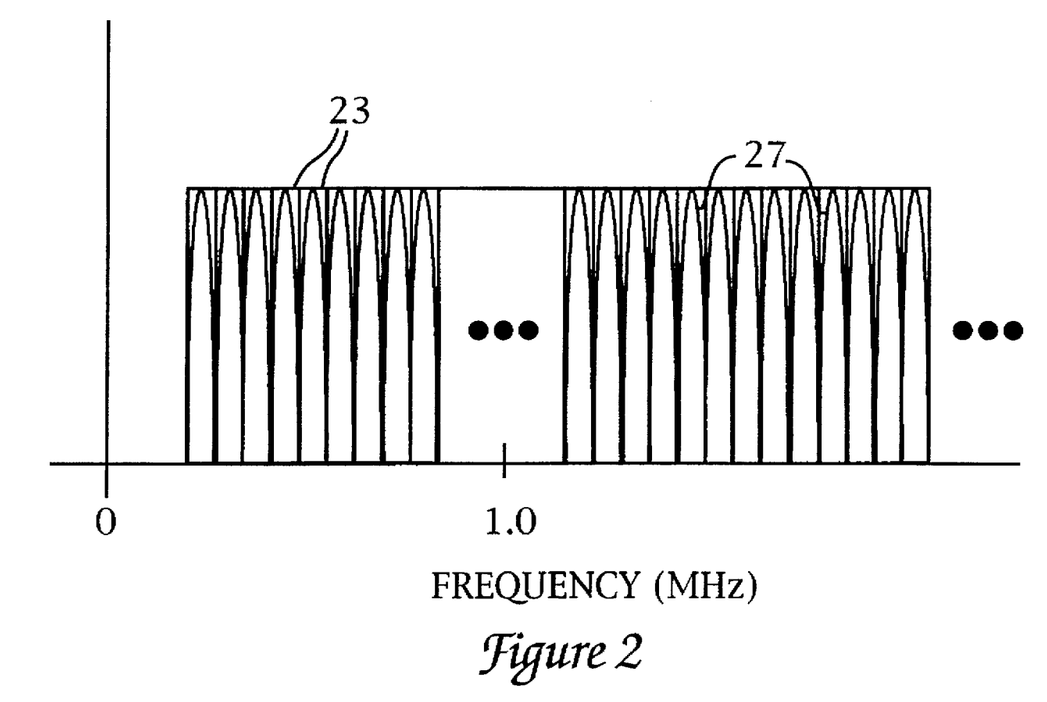
FIG. 2 is a frequency diagram illustrating the use of a multiplicity of delimited sub-channels used in a DMT system.

As is also well known to those skilled in the art, DMT transmission inherently partitions a transmission medium into a number of sub-channels 23 that each carry data independently. The data on each sub-channel 23 can correspond to a different signal or can be aggregated into higher data rates that represent a single or fewer wider-bandwidth transmissions. These sub-channels 23 are implemented entirely with digital signal processing in DMT, which eliminates the need for analog separation filters and maximizes spectral efficiency. A representative DMT transmission band is illustrated in FIG. 2. As seen therein, the transmission band includes a multiplicity of sub-channels 23 over which independent carrier signals (referred to as sub-carriers 27) may be transmitted. The number of sub-channels used may be widely varied in accordance with the needs of a particular system. However, when modulation is performed using an Inverse Fast Fourier Transform (IFFT), typical values for the number of available sub-channels 23 are integer powers of two, as for example, 128, 256, 512, 1024 or 2048 sub-channels 23. By way of example, in one embodiment that is adapted for use in a cable based subscriber system, 1024 sub-carriers 27 may be used with each carrier confined to a 32 kHz sub-channel 23. This provides approximately 32 MHz of frequency bandwidth in which the remote units can communicate with the central unit 10.

The number of remote units that may be used in any particular system may vary greatly in accordance with the needs of a particular system. By way of example, in one embodiment of the described cable based subscriber system, it may be desirable to permit up to 500 remote units to communicate with a single central unit. In systems that contemplate such a large number of remote units, it may be desirable to allocate the remote units in groups. Of course, the groups need not each contain the same number of units. By way of example, a system that permits up to 500 remote units may divide the remote units into eight groups, with each group permitting up to 90 remote units, with each remote unit group being assigned a designated frequency band. For example, the frequency spectrum may be divided into a plurality of equally sized designated frequency bands. In the particular embodiment described, one-eighth of the 32 MHz, or approximately four megahertz would be assigned to each group. Therefore, each group would have 4 MHz, and correspondingly, 128 sub-channels 23 to use for transmitting to the central unit 10. Grouping allows the central unit 10 to keep track of the remote units in a manageable manner as they come on and off line.

The groupings can be made using any number of methods. By way of example, a first group could consist of consecutive sub-channels 0–127, a second group sub-channels 128–255 and so forth. Alternatively, the allocation of sub-channels 23 to the respective groups may be interleaved throughout the spectrum. For example, the first group may be assigned sub-channels 0, 8, 16, 24, 32 . . . ; the second group may have sub-channels 1, 9, 17, 25, 33 . . . ; the third group: 2, 10, 18, 26, 34 . . . ; and so forth. The interleaving of sub-channels 23 assigned to the groups helps to reduce the probability that noise located in one particular area of the frequency spectrum will corrupt a significant portion of the transmissions in a single group. Instead, the spurious noise will affect only a portion of the spectrum for each group. As can be appreciated by those skilled in the art, the frequency bandwidth of the upstream channel, size of the sub-channels 23 and the groupings are not restricted to the numbers in the described embodiment but can be chosen to suit the needs of the particular use of the transmission system.

Figure 3:
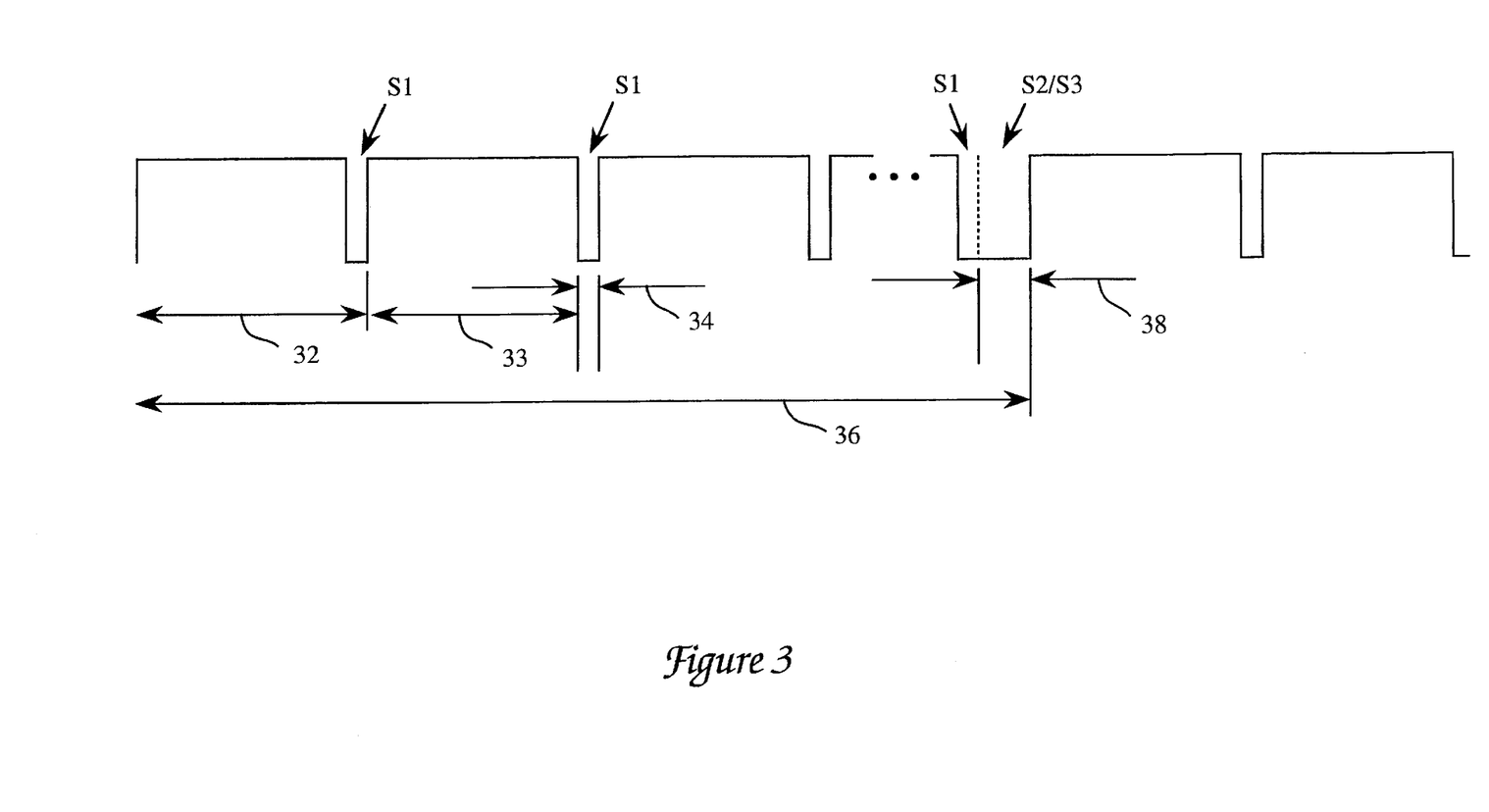
FIG. 3 is a timing diagram of a DMT data transmission system in accordance with one embodiment of the present invention.

As will be described in more detail below, in one aspect of the present invention, synchronized quiet times are periodically provided in the upstream communication stream. The synchronized quiet times may be used to handle a variety of overhead type functions such as initialization of new remote units, transmission channel quality checking and handling data transfer requests. Referring next to FIG. 3, a representative frame delimited transmission timing sequence is illustrated that provides a number of synchronized quiet periods that are suitable for handling the overhead functions. In the embodiment shown, the transmissions are broken up into string of transmission frames 32. Each transmission frame includes a transmission interval 33 and a first quiet interval S1. A plurality of transmission frames 32 are then grouped together into a super-frame 36. In addition to the transmission flames 32, each super-frame 36 also includes a second quiet time interval 38. In the embodiment described, the second quiet time interval 38 may be used as either an initialization interval (S2) or a retraining interval (S3).

The actual periods provided for the transmission interval 33, the quiet time interval S1, the initialization interval S2 and the retraining interval S3 may be widely varied in accordance with the needs of a particular system. Similarly, the number of transmission frames 32 in a super-frame 36 may be widely varied. By way of example, one suitable embodiment for use in the described cable-based subscriber system, contemplates a transmission interval 33 set to a period sufficient to transmit 64 symbols and the S1 time interval 34 set to one symbol in length of time. The length of the second quiet time interval 38 is typically determined by the physical aspects of the communications system, as will be discussed in more detail below. In general, the remote units are required not to broadcast during an S1 or S3 quiet time interval unless given permission by the central unit 10. The remote units are also required not to broadcast during an S2 quiet time interval unless they are seeking to initiate installation as will be described in more detail below.

Figure 4:
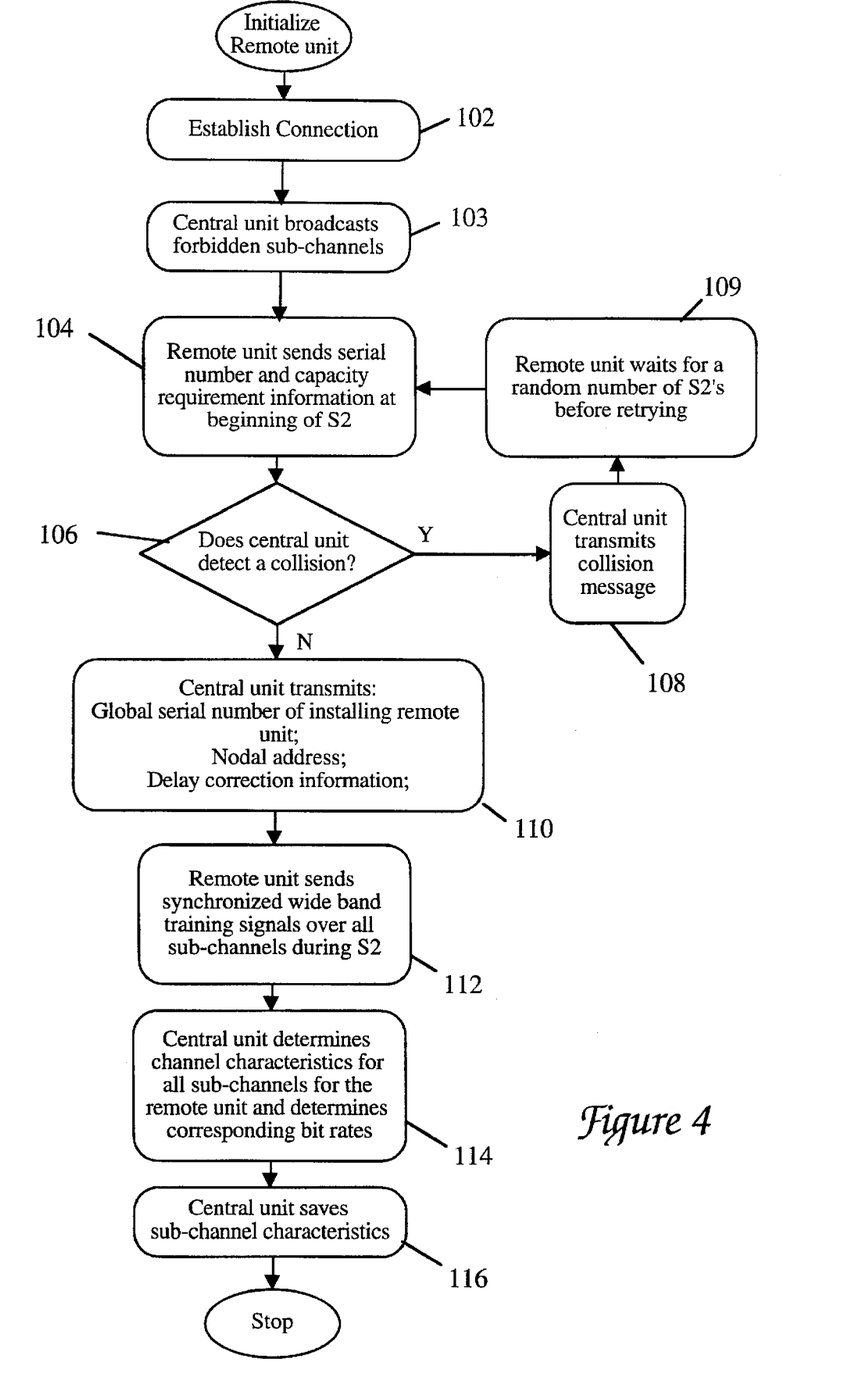
FIG. 4 is a flow diagram illustrating a method of initializing a remote unit in accordance with one aspect of the present invention.

Referring to FIG. 4, a method of initializing a first remote unit during installation that utilizes the described second quiet times S2 in accordance with one aspect of the invention will be described. When a remote unit first comes on line it must be initialized such that the transmissions from the first remote unit are synchronized with the transmissions of any other currently installed remote units. That is, the frame boundaries of upstream DMT communications from the various remote units to the central unit must be substantially synchronized at the central unit for the transmissions to be understood by the central unit. The method described with reference to FIG. 4 is one method of accomplishing such synchronization utilizing the described quiet times.

Initially, the remote unit to be installed must establish a connection to the transmission network in step 102. The connection enables the remote unit to listen to the downstream transmissions from the central unit 10 and transmit on any sub-channel 23 of the upstream channel. In some systems, there may be certain frequency ranges that the system may not use. By way of example, in many cable systems there may be established networks that utilize specific frequency bands. In order to prevent interference and maintain backward compatibility, it is important that the remote unit never transmit in the forbidden frequency range, even during initialization. Of course, certain frequency bands may be forbidden for other reasons as well. Accordingly, in step 103, the central unit will periodically broadcast an identification of frequencies that may never be used. In systems that utilize the concept of remote unit groups as discussed above, the central unit may also periodically broadcast the group number of the group that should be used by the next remote unit to be installed. Alternatively, the group assignment can be handled at a later point.

The newly connected remote unit listens to the downstream signals for information indicating that certain sub-channels may not be used. The downstream signal also includes the frame timing and quiet period markers required to synchronize the remote unit with the central unit. After the remote unit has synchronized itself with the downstream signal, in step 104 it transmits an initialization signal at the beginning of an S2 quiet period. In one system, this is done by transmitting an initialization signal immediately upon receiving an S2 quiet period marker signal. The initialization signal indicates to the central unit 10 that a remote unit requests to be installed onto the system. The remote unit may determine the onset of an S2 initialization quiet period in any suitable manner. By way of example, a flag may be provided by the central unit 10 in the downstream communications. The remote unit may transmit its initialization signal over all the sub-channels 23, over a group of sub-channels 23 or on a single sub-channel 23 depending on the needs of a particular system. In a preferred embodiment, the downstream signal indicates the group to be used by the next unit to be installed, and the initialization signal is transmitted over all the sub-channels in that group.

The upstream initialization transmissions from the remote units to the central unit 10 can be accomplished in any modulation scheme suitable for transmitting digital information. By way of example, amplitude, frequency, and quadrature phase shift key (QPSK) modulation schemes can be utilized. For the synchronization signal, differential QPSK (DQPSK) modulation is desired in a preferred embodiment to decrease the possibility of corruption by noise. Additionally, the synchronization can be encoded with a large amount of error correction and redundancy to ensure coherent communications.

The initialization signal preferably contains information about the remote unit. In a preferred embodiment the initialization signal carries the global address of the remote unit and the maximum transmission data rate requirement of the first remote unit. A global address, is similar to addresses used on ethernet or cellular devices. Such addresses are built into the communications device and are distinct from addresses of all other communicating devices. The maximum data rate required by the remote unit is dependent upon the type of device the remote unit is. For example if the remote unit is a television set it would require minimal communications capacity to the central unit 10, possibly only using the upstream signals to send information about movie selections or listener feedback. On the other hand, if the remote unit is a teleconferencing transceiver then a large amount of bandwidth would be required to transmit video and audio information from the remote unit to the central unit 10. Other pieces of relevant information about the first remote unit can also be sent along with the initialization signal in other embodiments.

Upon receiving the initialization signal from the first remote unit, the central unit 10 determines in step 106 whether the initialization signal from the first remote unit has collided with another initialization signal from another remote unit trying to connect at the same time. If a same time. If a collision is detected then the central unit 10 transmits a collision message back to the remotes in step 108. The collision message indicates to the remote units trying to connect to try again. The colliding remote units then each wait a random number of S2 periods before re-sending an initialization signal. The probability of two remote units trying to initialize at the same time is small. By requiring the colliding units to wait random amounts of time that are independent of each other, the probability of repeat collisions is reduced even further.

After the central unit 10 receives a valid initialization signal from the first remote unit, the central unit 10 transmits a synchronization signal 110 back to the remote unit. In one embodiment, the synchronization signal includes the global address of the first remote unit, a nodal address assigned to the first remote address, delay correction information, and information about the allocation of the sub-channels 23 in the upstream channel. The global address allows the first remote unit to identify that the synchronization signal is intended for it. The nodal address is assigned to the first remote unit in order to facilitate efficient communications. The global address can be quite long (as for example 48 bits) to allow for an adequate number of global addresses for all the communicating devices that are likely to be manufactured. The nodal address is a shorter address since only a limited number of remote units will be communicating with any single central unit 10. When a multi-grouped system is used, the nodal address also contains information about the group to which the first remote unit is assigned. In the embodiment described above which contemplates a total of eight groups, that part of the address would be three bits to identify which of the eight groups the first remote unit is in. The remainder of the bits can uniquely identify the node within its group.

The delay correction information tells the first remote unit how much the frames being broadcast from the first remote unit must be delayed in order to synchronize them with signals from the other connected remote units. The delay correction is determined from the amount of delay that the central unit detects between the time it transmits a quiet period (S2) marker and its reception of the initialization signal. Using this information the first remote unit can adjust its transmissions and become synchronized with the other connected remote units, such that the frames of the remote units arrive at the central unit 10 at the same time. The first remote unit may also learn which sub-channels 23 are currently in use by the other connected remote units. In another embodiment, information about sub-channel 23 characteristics are regularly transmitted to all the remote units through the downstream channel. In such systems, channel usage information would not be required to be sent along with the synchronization signal.

One advantage of transmitting the initialization signals over a broad portion of the available spectrum is that delays may vary to some extend depending upon the frequency at which the signal is transmitted. Therefore, when the initialization signals are transmitted over a variety of the sub-channels 23 the required phase shift can be calculated based on an average of the individual delays.

The length of the S2 time interval, as discussed earlier, is dependent upon the physical nature of the communications network. By way of example, in a typical cable system employing a coaxial cable distribution medium as the feeds 18 and a fiber optic trunk as the transmission line 17 the distance between the central unit 10 and the first remote unit can be as great as 35 miles. The length of the coaxial cable branching from the fiber trunk can be as great as 2 miles. In a preferred embodiment the S2 time interval should be long enough for the S2 marker to travel from the central unit to the furthest contemplated remote unit, and an initialization signal that is responsive to the S2 marker to be returned to the central unit before the end of the S2. Using the lengths of 35 and 2 miles for the fiber and coaxial lines, respectively, and given their propagation times of approximately 5.5 and 7.5 microseconds per mile, a total round trip of a signal would take 415 microseconds. In a preferred embodiment a symbol is approximately 30 microseconds long. Therefore, a round-trip would take approximately 14 symbols of time. Practically, an additional buffer time should be added to account for any other extraneous delays along the lines of communications. By way of example an S2 time interval of 16 symbols in length may be appropriate.

In certain embodiments, it may be desirable to repeat steps 104–110 to validate the information received and/or ensure that the remote is properly synchronized.

After synchronization has been accomplished, the first remote unit responds by sending a set of synchronized wide band training signals over all the sub-channels 23 during the next available S2 or S3 time interval in step 112. The specifics of the training step will be described in more detail below with reference to FIG. 5. In some embodiments, the central unit 10 will direct the first remote unit to use a specified S3 time interval (e.g., wait for the third S3). Upon receipt of the training signals, the central unit 10 determines the capacities of the various sub-channels 23 to handle transmission between the first remote unit and the central unit 10 (step 114). The central unit 10 preferably has a prior knowledge of the contents of the training signals. This allows the central unit 10 to learn the optimal forward equalization of the sub-channels 23 and also the maximum bit rates a sub-carrier 27 can carry on the sub-channels 23 between the first remote unit and the central unit 10. The central unit 10 saves the channel characteristics of the sub-channels 23 with respect to the first remote unit 116. In a preferred embodiment the central unit 10 saves the information in a bits/carrier matrix that contains an indication of the number of bits that each of the sub-channels 23 can carry to each of the remote units. Such a matrix allows the central unit 10 to keep track of the capacity of each of the various sub-channels 23 and is available when allocating bandwidth to the remote units. This also facilitates the dynamic allocation of sub-channels based upon the current characteristics of the transmission environment.

Figure 5:
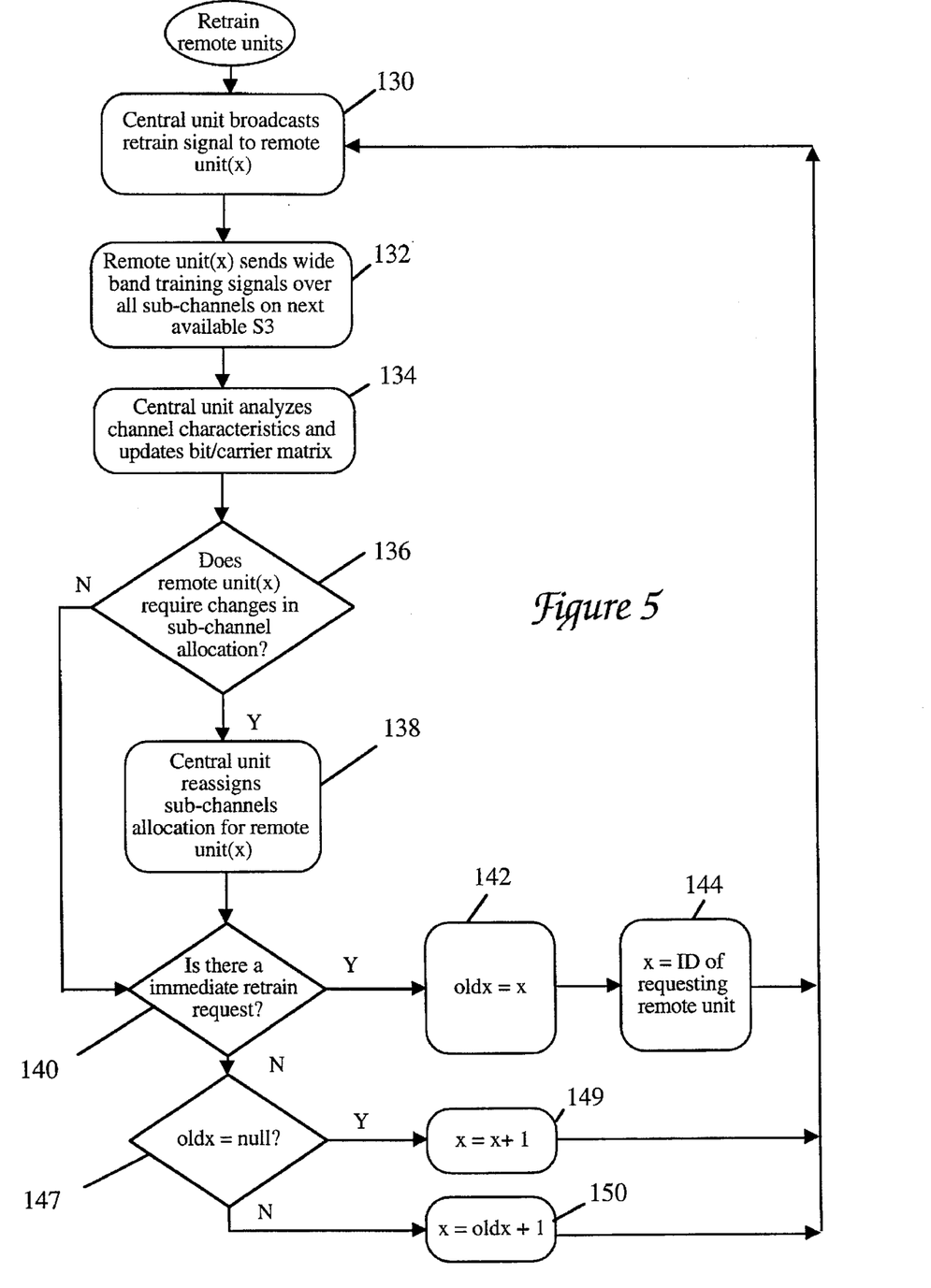
FIG. 5 is a flow diagram illustrating a method of retraining a remote unit in accordance with a second aspect of the present invention.

Referring next to FIG. 5, a method of periodically checking the capacity of the various sub-channels from a selected remote unit to the central unit will be described. As will be appreciated by those skilled in the art, the capacity of the transmission line at various frequencies may vary somewhat over time. Therefore, it is desirable to periodically update the central unit's information concerning the characteristics of the sub-channels 23 with respect to each of the remote units it services. In the embodiment described, such updating is done during the S3 quiet periods. In the embodiment shown, the S3 quiet periods are of the same length as the S2 quiet periods. It should be appreciated that a single transmission line checking process may be used both for the initial training and the periodic checking.

In the described embodiment, the central unit 10 initiates a retraining event in step 130 by transmitting a retraining command to a first remote unit (remote unit x) that is in current communication with the central unit 10. The first remote unit waits for the next available S3 retraining quiet time interval to transmit a set of training signals over the available sub-channels 23. (Step 132). In an alternative embodiment, the central unit 10 may assign a specific S3 quiet interval to use for transmitting the training signals, instead of the next available S3 time interval. The set of training signals will typically be limited to the sub-channels allocated to the group and will typically be further limited to some subset of the total available group sub-channels to provide a cost effective design. Therefore, the number of training signals that are actually used may be widely varied in accordance with the needs of a particular system. As in the initialization process, the central unit 10 analyzes the signals it receives and updates the bit/carrier rates in the channel characteristics matrix that correspond to the associated remote unit. (Step 134). The central unit 10 then determines whether a change in the sub-channel allocation is necessary for the remote unit. That is, it may determine whether additional or fewer sub-channels 23 should be allocated to the first remote unit in order to meet the first remote unit's throughput and error probability requirements. If a change is necessary, then the central unit 10 re-allocates sub-channels 23 to the first remote unit in step 138.

If it is determined that no correction is required in step 136 or after any necessary changes have been made in step 138, the central unit 10 checks to see if there have been any requests made by any other remote units for an immediate retraining in step 140. If it is determined in step 140 that there are no immediate retraining requests, the central unit 10 checks to see if the retraining of the first remote unit was a result of a immediate retraining request by checking if there is a valid old address (oldx) in step 147. If there is no valid old address then the central unit 10 increments the counter (x) in step 149 and returns to step 130 where it broadcasts a retrain signal to the next remote unit. On the other hand, if it is determined in step 140 that there was a valid old address, the central unit 10 will adjust the counter such that it reads one more than the old address, which corresponds to the address of the remote unit that would have been next at the time an immediate retrain request was received. (Step 150). That is, x=oldx+1.

If an immediate retrain request was detected in step 140, then the central unit 10 saves the address of the first remote unit as an old address (oldx) in step 142. The central unit 10 then sets the counter (x) to the address of the requesting remote unit and uses it as the address of the next remote unit currently being retrained 144. The logic then returns to step 130. The retraining process may then be continually repeated among all the remote units currently communicating with the central unit 10. Of course, the algorithm used to select the remote units for retraining may be widely varied to meet the requirements of any particular system.

In one embodiment, the remote units that have been initialized but are not currently communicating with the central unit 10 are also retrained. In that case, the central unit 10 need not determine if the allocation of sub-channels 23 has to be changed for the remote unit being retrained since it is not actively communicating with the central unit 10. The central unit 10 can merely save the updated channel characteristics to be used when the remote unit requests communication with the central unit 10.

The central unit 10 is preferably adapted to receive a retraining request on unused sub-channels 23 during a transmission time interval 32. In a preferred embodiment, the transmission time interval 32 is 64 symbols long, corresponding to the maximum number of possible remote units within a group. A remote unit requiring an immediate retraining transmits a flag during one of the symbol times assigned to the requesting remote unit in the transmission time interval 32. In this manner, the central unit 10 can immediately determine which remote unit sent the request by the location of the flag. For example, remote units 0–63 in group eight may be assigned symbols 0–63 respectively in the transmission time interval. If a flag arrives on an unused sub-channel 23 in the group eight frequency band during the ninth symbol position, then the central unit 10 knows that the ninth remote unit in group eight has sent a retraining request. As can be appreciated by those skilled in the art, the assignment of remote units to symbols can be accomplished in many different ways.

As discussed above, in order to facilitate a dynamically allocated discrete multi-tone transmission scheme, there must be some mechanism by which the remote units can communicate a data transmission request to the central unit. In one embodiment, the S1 quiet times are used in conjunction with a data transmission request to facilitate initiation of a transmission. In the described embodiment, a remote unit may send three types of data requests to the central unit. They include a data packet request (DPR), a defined data packet request (DDPR) and a data rate request (DRR). As used in this embodiment, a data packet request indicates the remote unit's desire to transmit a specific volume of information (which is typically defined in terms of a number of data bytes). A defined data packet request indicates the remote unit's desire to transmit a packet or group of packets having characteristics already known to the central unit. A data rate request indicates the remote unit's desire to transmit data at a particular rate.

The described data transmission requests may be coupled with the immediate retrain request described above in a simple two bit signal that includes four states. By way of example, one state (1,1) may correspond to a Data Rate Request; a second state (1,0) may correspond to a Data Packet Request, a third state (0,1) may correspond to an immediate retrain request, and a fourth state (0,0) may correspond to a Defined Data Packet Request. Of course, the same information can be included as part of a larger signal and/or the meaning of the various states may be varied. As described above, the two bit data transmission request signal may be transmitted by a remote unit over sub-channels that are not in use. By assigning a particular symbol to each remote unit, the central unit can readily identify the requesting remote unit without requiring any independent identification information in the data transmission request signal.

As will be appreciated by those skilled in the art, in addition to merely identifying the type of information the remote unit wishes to transmit, in the case of both the Data Rate Request and the Data Packet Request, the remote will normally need to provide substantially more information to the central unit in order for the central unit to properly handle the request. In order to provide quick access times, the extra information is relayed to the central units during the next available S1 quiet time interval. More specifically, when the central unit 10 receives a valid data packet request or a valid data rate request, the central unit 10 directs the requesting remote unit to transmit any additional information about the requesting remote unit's request during the next available S1 quiet period 34. During the S1 quiet period, the requesting remote unit has access to as many sub-channels as it needs to transfer the header information. Since both the Data Rate Request and the Data Packet Request effectively request only the allocation of an S1 quiet period, they could readily share a single state in the two bit data transmission request signal. Accordingly, in alternative embodiments, a single state could be provided to indicate the desire for allocation of a S1 quiet period and the nature of the request could be transmitted during the S1 period along with the other information.

When the system is not being heavily used, there may be a relatively large number of sub-channels that are available to the remote unit when it sends its data transmission request. During such periods, it may be possible to transmit all of the required header information during the remote unit's assigned timing symbol on unused sub-channels. Thus, in one alternative embodiment, the free state in the data transmission request may be used to flag to the central unit that the remote unit is transmitting the required header information on unused sub-channels simultaneously with the data transmission request. Again, the timing of the data transmission request would identify the remote unit sending the request. Thus, the advantage of this approach is that during times of relatively light usage, the access times for data rate and data packet requests may be even further reduced. Conflicts would not occur between two remote units since each remote only transmits during its assigned symbol period. When the remote unit determines that there is not enough bandwidth to accept all of the required header information in the assigned symbol period, it would simply request allocation of an S1 quiet period as described above.

In another embodiment, the central unit 10 can assign a specific S1 interval 34 for the requesting remote unit to use. This is especially useful when two or more remote units simultaneously make data packet or data rate request.

Figures 6A, 6B:
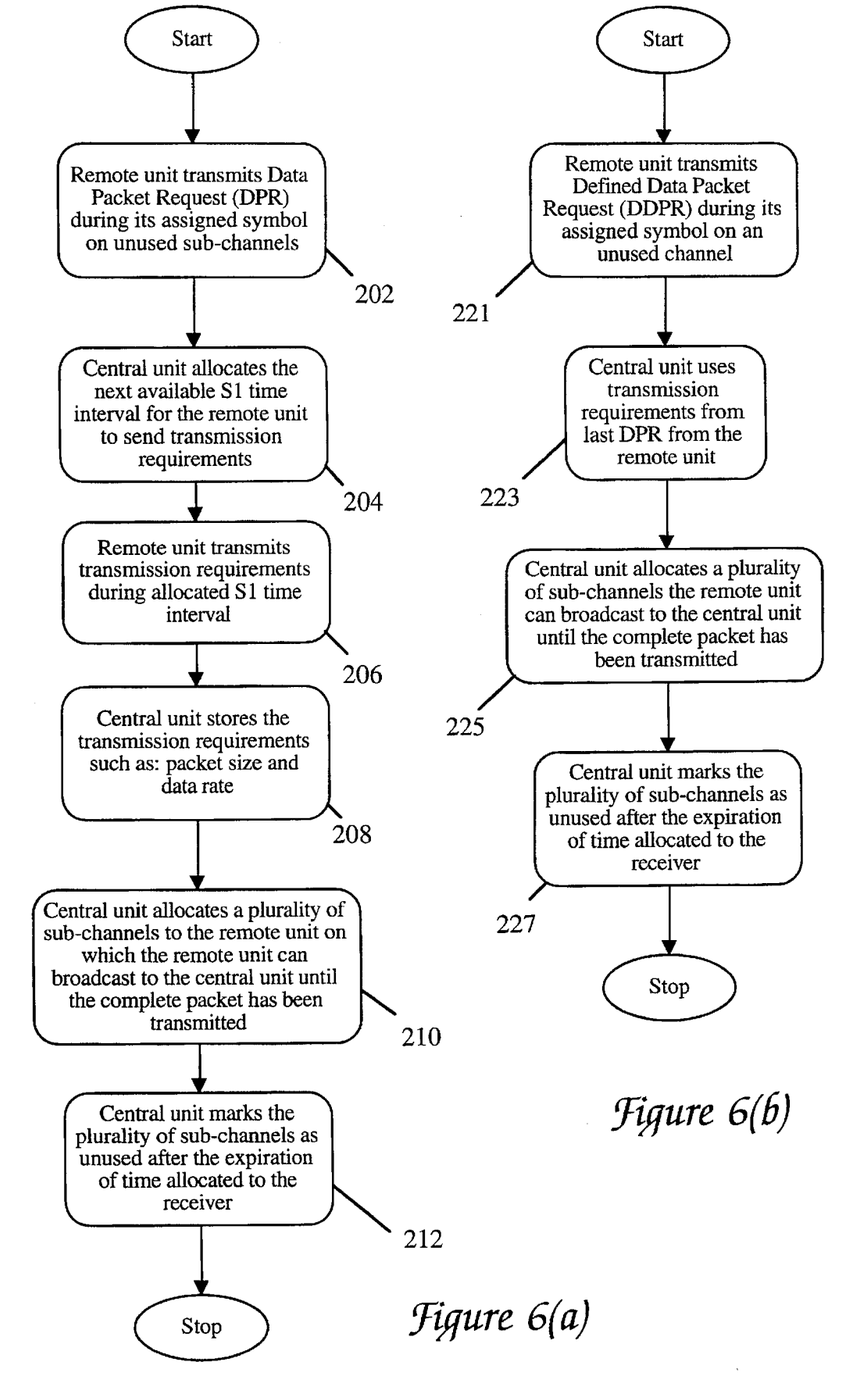
FIG. 6(a) is a flow diagram illustrating a method of allocating bandwidth to a remote unit making a data packet request.
FIG. 6(b) is a flow diagram illustrating a method of allocating bandwidth to a remote unit making a defined data packet request.

Referring to FIG. 6(a) a method of handling a data packet request will be described in more detail. Initially, a requesting remote unit sends a data packet request during its assigned symbol in a transmission time interval 32 on one or more unused sub-channel 23 (Step 202). After receiving the data packet request and determining its source based on the symbol during which the request is received, the central unit 10 allocates the next available S1 time interval 34 to the requesting remote unit and forwards a message verifying the allocation with the downstream signal (Step 204). Then in step 206, the requesting remote unit transmits the additional information during the allocated S1 time interval 34. By way of example, the additional transmission requirements may include the address to which the data is being sent, the packet size, and a priority rating. The central unit 10 then stores the additional data packet information that it receives in step 208. The central unit 10 then determines the number of sub-channels that should be allocated for the remote units requests and transmits instruction as to the sub-channels that are to be used together with the allowable bit rates per channel back to the requesting remote unit. It should be appreciated that the central unit 10 will allocate sub-channels 23 based upon the stored set of channel characteristics that correspond to the requesting remote unit 210. In this manner the central unit 10 can dynamically allocate the most efficient number of sub-channels 23 to handle the remote unit's request. It should be appreciated that the central unit receiver knows the amount of data to be transmitted (from the information received during the S1 quiet period), as well as the data transmission rates (which the central unit has specified). Therefore, the central unit knows the amount of time that is needed to complete the transmission. Accordingly, the central unit 10 allocates the designated number of sub-channels 23 to the requesting remote unit only for the amount of time required for the requesting remote unit to transmits its packet(s). After the specified amount of time has elapsed (with any necessary buffer), the central unit 10 makes note that the sub-channels 23 assigned to the first remote unit are now unused and ready to be re-allocated to any other remote unit. (Step 212).

Referring next to FIG. 6(b), a method of handling a defined data packet request will be described. In a defined data packet request, the central unit must rely on the additional data packet defining information that was stored in step 208. Again, this may include such things as the address to which the packet(s) is being sent and the packet size. Thus, in the described embodiment, a defined data packet request can be handled only if it is transmitted by a remote unit that has previously sent a DPR. In alternative embodiments, appropriate defaults could be provided to permit the use of defined data packets even when no data packet request has been sent.

As illustrated in FIG. 6(b), in step 221, the requesting remote unit initially transmits a defined data packet request during its assigned symbol time on an unused sub-channel 23. The central unit 10 knows the identity of the requesting remote based on the timing of the request signal. Thus, in step 223, the central unit looks up the stored defined data packet transmission requirements and uses that information in directing and/or handling the data packet(s) received. It should be appreciated that the central unit 10 does not need to receive any additional information during an S1 time interval 34 and therefore can immediately allocate one or more sub-channels 23 to the requesting remote unit in step 225. Again, since the amount of information to be transmitted and the data transmission rates are both known, the central unit only allocates the sub-channels for the amount of time necessary to transmit the package. After the appropriate transmission time has elapsed, the central unit 10 notes that the sub-channels 23 are now free to be re-allocated in 227.

While many communicating devices can effectively communicate through packetized communications, others require a constant rate of transmission that is sometimes difficult to obtain using packetized transmission systems. Such remote units can be accommodated by allocating a number of sub-channels 23 that is sufficient for handling the required data transmission rate for an indeterminate amount of time. That is, until the remote unit indicates that the bandwidth is no longer required or an error is detected. By way of example, video conferencing is likely to have such requirements. In the described embodiment, this type of data transmission request is handled through the use of a data rate request.

Figure 7:
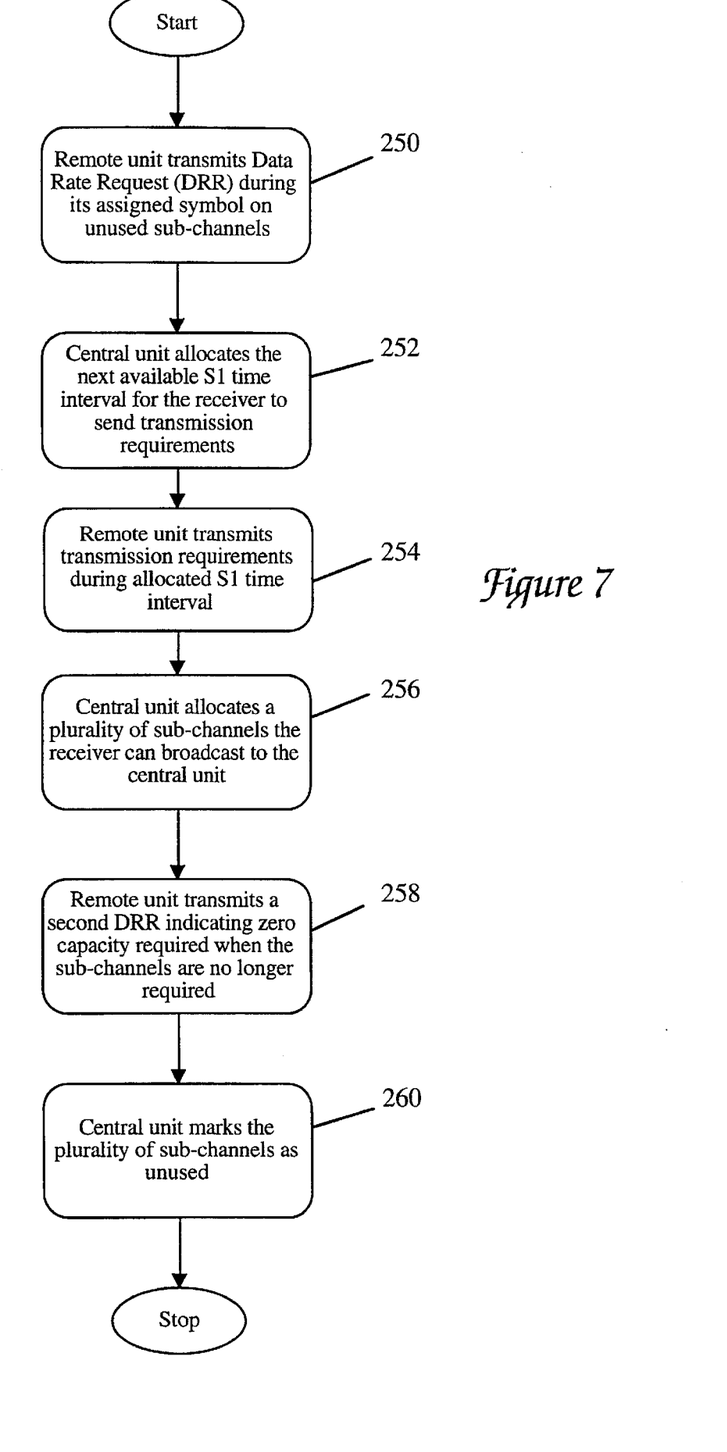
FIG. 7 is a flow diagram illustrating a method of allocating bandwidth to a remote unit making a data rate request.

Referring next to FIG. 7, a method suitable for handling data rate requests will be described. Initially, in step 250, the requesting remote unit sends a data rate request (DRR) on an unused sub-channel during its assigned symbol in a transmission time interval 32 as described above. Again, the central unit 10 will typically require additional transmission information such as address and the requested data rates. Accordingly, in step 252, the central unit allocates the next available S1 quiet period to the requesting remote unit to send the required information. The requesting remote unit then sends the additional transmission information during the allocated S1 time interval in step 254. Knowing the data rate requirements as well as the permissible bit rates for each sub-carrier, the central unit 10 allocates an appropriate number of sub-channels 23 to handle the requested throughput in step 256. When the requesting remote unit no longer needs to transmit, it sends a new data rate request indicating that zero capacity is required in step 258. The central unit 10 understands this as a termination request and marks the appropriate sub-channels as unused in step 260.

There is no set period that is ideal for repeating the S1 quiet periods. On the one hand, the more frequent the S1 quiet periods, the shorter the access times that can be achieved will be. Thus, the more responsive the system will be. On the other hand, more frequent S1 quiet periods require more overhead which reduce overall system capacity. Thus, the appropriate frequency of the S1 periods will vary somewhat in accordance with the needs of any particular system. In the embodiment shown, the S1 quiet periods are used to delimit the frames, although it should be appreciated that this is not a requirement. In general, the use of the S1 quiet periods will reduce the access time required to initiate a communication. When appropriate, the use of DDPRs can further reduce the access time of the requesting remote unit.

As described above, initialization time intervals, S2, and retraining time intervals, S3, are not as numerous as the S1 quiet periods because initialization and retraining usually do not demand as rapid a response as a request for an immediate communications. In one embodiment, S2's and S3's alternate every other super-frame 36. In yet another embodiment, S2's and S3's can be allocated dynamically by the central unit 10 to adjust for changing circumstances. By way of example, more of the reserved time intervals 38 can be allocated as initialization time intervals at times when remote units are more likely to be installed and require initialization, such as during the day. During the evening when installations are less likely, more of the reserved intervals 38 can be allocated as retraining time intervals.

While the present invention is mainly concerned with the manipulation of upstream communications from the remote units to the central unit 10, no restrictions are placed upon the type of downstream communications applicable to such a system. The downstream channel can utilize discrete multi-tone modulation similar to the modulation used for upstream communication, or it may utilize other suitable techniques, such as, quadrature amplitude modulation (QAM) or vesigial sideband (VSB). Also, the downstream channel can be further comprised of dedicated overhead channels for transmitting the relevant formatting signals, such as, but not limited to: S1, S2 and S3 flags, synchronization signals, and information about the allocation of the sub-channels 23. As appreciated by those skilled in the art, numerous other methods of transmission schemes can be applied to the downstream channel in relation to the present invention.

Although only a few embodiments of the present invention have been described in detail, it should be understood that the present invention may be embodied in many other specific forms without departing from the spirit or scope of the invention. In view of the foregoing, it should be apparent that the present examples are to be considered as illustrative and not restrictive, and the invention is not to be limited to the details given herein, but may be modified within the scope of the appended claims.

We claim:

1. In a bi-directional data transmission system that facilitates communications between a plurality of remote units and a central unit on a common bi-directional transmission medium and using a frame based discrete multi-tone transmission scheme that has a multiplicity of discrete sub-channels for facilitating upstream communications between the plurality of remote units and the central unit, a method of synchronizing frames transmitted from a selected first remote unit to the central unit with frames transmitted from other remote units to the central unit, such that frame boundaries of the flames transmitted from the first remote unit arrive at the central unit substantially in synchrony with frame boundaries of frames transmitted from the other remote units, the method comprising the steps of:

periodically providing synchronized quiet times on the multiplicity of discrete sub-channels provided for facilitating upstream communications in accordance with the discrete multi-tone transmission scheme on the common bi-directional transmission medium; and transmitting an unprompted broad band initialization signal on the common bi-directional transmission medium from the first remote unit to the central unit during a first selected synchronized quiet time, the broad band initialization signal including a plurality of initialization signals transmitted over distinct sub-channels, each of the sub-channels carrying data independently of other sub-channels on the common hi-directional transmission medium and independently of the other remote units, the broad band initialization signal having a frame boundary.

2. A method as recited in claim 1 wherein:

when the first remote unit desires to establish communications with the central unit, said first remote unit monitors downstream communication broadcast by the central unit and substantially synchronizes the frame boundary of the broad band initialization signal with a frame timing marker carried in downstream signals received by the remote unit;

the central unit receives the broad band initialization signal and sends a synchronization signal to the first remote unit, the synchronization signal having information indicative of a frame boundary shift required to better synchronize frame boundaries of signals sent by the first remote unit with frame boundaries of signals sent by other remote units that are communicating with the central unit; and shifting the boundary of the frames outputted by the first remote unit in response to the synchronization signal to better synchronize the frame boundaries of the frames outputted by the first remote unit with the frame boundaries of frames output by the other remote units that are currently communicating with the central unit; and whereby the synchronization is arranged such that when fully synchronized, the frame boundaries from the various remotes will substantially coincide when they are received at the central unit.

3. A method as recited in claim 2 wherein the downstream communications are discrete multi-tone signals and the frame timing marker carried in the downstream signals received by the remote unit are frame boundaries of the downstream discrete multi-tone signals.

4. A method as recited in claim 2 wherein the downstream communications are quadrature amplitude modulated signals.

5. A method as recited in claim 1 further comprising the step of periodically providing synchronized trainings times on the plurality of discrete sub-channels provided for facilitating upstream communications, wherein remote units that are not requested to train or retrain during a particular training time are quiet during that particular training time. of channel characteristics indicative of the channel capacities of the multiplicity of sub-channels.

6. A method as recited in claim 5 further comprising the step of causing the first remote unit to send a plurality of training signals over a number of the sub-channels provided for facilitating upstream communications during a selected training time.

7. A method as recited in claim 6 further comprising the step of determining a first set of channel characteristics indicative of the channel capacities of the multiplicity of sub-channels provided for facilitating upstream communications.

8. A method as recited in claim 7 further comprising the step of saving the first set of channel characteristics within a matrix of channel characteristics, wherein said matrix contains information indicative of the channel capacities of the multiplicity of discrete sub-channels between all the remote units and the central unit.

9. A method as recited in claim 1 further comprising the steps of:
  recognizing a conflict when more than one of said remote units transmits an associated broad band initialization signal during the first selected synchronization time;
  transmitting a conflict signal to the plurality of remote units in response to the broad band initialization signals when a conflict is recognized; and
  wherein each of the conflicting remote units resends its broad band initialization signal during a later one of said synchronized quiet times, the conflicting remote units being arranged to each wait an independently random interval prior to resending its broad band initialization signal.

10. A method as recited in claim 1 wherein the synchronized quiet time has a period that is sufficiently long such a quiet period marker transmitted from the central unit may be transmitted to the remote unit that is furthest from the central unit and an initialization signal that is responsive to the quiet period marker returned to the central unit all within the synchronized quiet time.

11. A method as recited in claim 1 wherein the bi-directional data transmission system is a cable system that includes the transmission of signals over a coaxial cable.

12. A method as recited in claim 1 wherein the bi-directional data transmission system is an Asymmetric Digital Subscriber Line system that includes the transmission of signals over twisted pair telephone lines and wherein the modulator modulates the encoded digital information onto sub-carriers that correspond to sub-channels that each have a bandwidth that is approximately 4.3125 KHz wide.

13. A method as recited in claim 1 wherein the bi-directional data transmission system is a digital cellular television system that includes the transmission of radio signals.

14. A method as recited in claim 1 wherein sub-channels available to the selected remote unit for transmission of data to the central unit are dynamically allocated.

15. A method as recited in claim I further comprising the step of periodically transmitting from the central unit an indication of sub-channels that are forbidden from use by the remote unit, wherein the remote unit makes sure that the broad band initialization signal does not include any transmissions in the sub-channels that are forbidden from use.

16. Digital Subscriber Line data transmissions system that facilitates communications to and from a plurality of remote units and a central unit using a frame based discrete multitone transmission scheme on a common bi-directional transmission medium, the discrete multi-tone transmission scheme having a first multiplicity of discrete sub-channels for facilitating upstream communications from the plurality of remote units to the central unit and a second multiplicity of discrete sub-channels for facilitating downstream communications from the central unit to the plurality of remote units, a method of synchronizing frames transmitted from a selected first remote unit to the central unit with frames transmitted from other remote units to the central unit on different ones of the first multiplicity of discrete sub-channels such that frame boundaries of the frames transmitted from the first remote unit arrive at the central unit substantially in synchrony with frame boundaries of frames transmitted from the other remote units, the method comprising the steps of:

periodically providing synchronized quiet limes on the first multiplicity of discrete sub-channels provided for facilitating upstream communications; and when the first remote unit desires to establish communications with the central unit, said first remote unit monitors downstream communication broadcast by the central unit and substantially synchronizes a frame boundary of an unprompted broad band initalization signal with a frame timing marker carried in downstream signals received by remmote unit;

transmitting the unprompted broad band initialization signal on the common bi-directional transmission medium from the first remote unit to the central unit during a first selected synchronized quiet time; and receiving the initialization at the central unit and sending a synchronization signal from the central unit to the first remote unit, the synchronization signal having information indicative of a frame boundary shift required to better synchronize frame boundaries of signals sent by the first remote unit with frame boundaries of signals sent by other remote units that are communicating with the central unit; and shifting the boundary of the frames outputted by the first remote unit in response to the synchronization signal to better synchronize the frame boundaries of the frames outputted by the first remote unit with the frame boundaries of frames output by the other remote units that are currently communicating with the central unit, and whereby the synchronization is arranged such that when fully synchronized, the frame boundaries from the various remotes will substantially coincide when they are received at the central unit.

17. A method as recited in claim 16 further comprising the step of periodically providing synchronized training times on the first multiplicity of discrete sub-channels provided for facilitating upstream communications, wherein remote units that are not requested to train or retrain during a particular training time are quiet during that particular training time.

18. A method as recited in claim 17 further comprising the step of causing the first remote unit to send a plurality of training signals over a number of the first multiplicity of sub-channels provided for facilitating upstream communications during a selected training time.

19. A method as recited in claim 18 further comprising the step of determining a first set of channel characteristics indicative of the channel capacities of the first multiplicity of sub-channels provided for facilitating upstream communications.

20. A method as recited in claim 19 further comprising the step of saving the first set of channel characteristics within a matrix of channel characteristics, wherein said matrix contains information indicative of the channel capacities of the first and second multiplicity of discrete sub-channels.

21. A method as recited in claim 16 further comprising the steps of:

recognizing a conflict when more than one of said remote units transmits an associated broad band initialization signal during the first selected synchronization time;

transmitting a conflict signal to the plurality of remote units in response to the broad band initialization signals when a conflict is recognized; and wherein each of the conflicting remote units resends its broad band initialization signal during a later one of said synchronized quiet times, the conflicting remote units being arranged to each wait an independently random interval prior to resending its broad band initialization signal.

22. A method as recited in claim 16 wherein the synchronized quiet time has a period that is sufficiently long such a quiet period marker transmitted from the central unit may be transmitted to the remote unit that is furthest from the central unit and an initialization signal that is responsive to the quiet period marker returned to the central unit all within the synchronized quiet time.

23. A method as recited in claim 16 wherein sub-channels available to the selected remote unit for transmission of data to the central unit are dynamically allocated.

24. A method as recited in claim 16 further comprising the step of periodically transmitting from the central unit an indication of sub-channels that are forbidden from use by the remote unit, wherein the remote unit makes sure that the broad band initialization signal does not include any transmissions in the sub-channels that are forbidden from use.

* * * * *

UNITED STATES PATENT AND TRADEMARK OFFICE
CERTIFICATE OF CORRECTION

PATENT NO. : 5,644,573
DATED : July 1, 1997
INVENTOR(S) : BINGHAM et al.

It is certified that error appears in the above-indentified patent and that said Letters Patent is hereby corrected as shown below:

[57] ABSTRACT, line 4, change "am to --are--
Column 1, line 21, change "MultiTone" to --Multi-Tone--
Column 3, line 21, change "flames" to --frames--
Column 3, line 23, change "flames" to --frames--
Column 7, line 38, change "flames" to --frames--
Column 9, line 18/19, after "time." please delete --If a same time.--
Column 12, line 52, change "(0,1 )" to --(0,1)--
Column 16, line 14, change "flames" to --frames--
Column 16, line 29, change "hi-directional" to --bi-directional--
Column 17, line 2, change "trainings" to --training--
Column 17, lines 6-8, after "time." delete --of channel characteristics indicative of the channel capacities of the multiplicity of sub-channels.--
Column 17, line 62, change "I" to --1--
Column 18, line 1, before "Digital", insert --In a--

Signed and Sealed this

Eleventh Day of November, 1997

Attest:

BRUCE LEHMAN

Attesting Officer

Commissioner of Patents and Trademarks